US 8,880,738 B2

(12) United States Patent
Regnier

(10) Patent No.: US 8,880,738 B2
(45) Date of Patent: Nov. 4, 2014

(54) PLUG-IN ARCHITECTURE FOR WSD DCP OPERATIONS

(75) Inventor: Alain Regnier, Francoville (FR)

(73) Assignee: Ricoh Company, Ltd., Tokyo (JP)

( * ) Notice: Subject to any disclaimer, the term of this patent is extended or adjusted under 35 U.S.C. 154(b) by 1403 days.

(21) Appl. No.: 12/395,545

(22) Filed: Feb. 27, 2009

(65) Prior Publication Data

US 2010/0223632 A1    Sep. 2, 2010

(51) Int. Cl.
G06F 15/16    (2006.01)
G06F 9/50    (2006.01)
G06F 9/445    (2006.01)

(52) U.S. Cl.
CPC .......... G06F 9/5055 (2013.01); G06F 9/44526 (2013.01)
USPC ....................................... 709/250

(58) Field of Classification Search
USPC ................................. 709/250, 205
See application file for complete search history.

(56) References Cited

U.S. PATENT DOCUMENTS

| | | | |
|---|---|---|---|
| 7,110,129 B2* | 9/2006 | Parrish et al. | 358/1.15 |
| 7,466,442 B2* | 12/2008 | Chapman | 358/1.18 |
| 7,669,060 B2* | 2/2010 | Fujiwara et al. | 713/193 |
| 2003/0225894 A1* | 12/2003 | Ito | 709/227 |
| 2008/0295074 A1* | 11/2008 | Schneider et al. | 717/120 |

* cited by examiner

*Primary Examiner* — John MacIlwinen
(74) *Attorney, Agent, or Firm* — Hickman Palermo Truong Becker Bingham Wong LLP; Daniel D. Ledesma

(57) ABSTRACT

Techniques are provided for a plug-in architecture for processing operations on a WSD DCP device. Such a device comprises a dispatcher, a plug-in handler, and one or more plug-ins. The dispatcher receives a SOAP request and determines, based on one or more operations associated with the SOAP request and a configuration file, whether one or more plug-ins need to be invoked. If one or more plug-ins need to be invoked, then the dispatcher calls the plug-in handler and passes data to the plug-in handler, which is configured to call the appropriate plug-in(s) and pass the data to the appropriate plug-in(s). The plug-in handler receives processed data from the appropriated plug-in(s) and sends the data to be processed by a lower level service, such as by a print service, a scan service, a facsimile service, or an archive service.

20 Claims, 3 Drawing Sheets

PLUG-IN ARCHITECTURE FOR WSD DCP OPERATIONS

FIELD OF THE INVENTION

The present invention relates to extending a Web service scan service to support the maintenance of multiple scan ticket templates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

WEB SERVICES

The World Wide Web Consortium ("W3C") is an international consortium that develops standards for the World Wide Web. The W3C defines a "web service" as a software system that is designed to support interoperable machine-to-machine interaction over a network. This definition encompasses many different systems, but in common usage, the term refers to those services that use Simple Object Access Protocol (SOAP)-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. Common core specifications are SOAP, WSDL, WS-Discovery, WS-MetadataExchange, WS-Addressing, and WS-Security. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example. SOAP messages are independent of any operating system or network protocol and may be transported using a variety of Internet protocols, including SMTP, MIME, and typically HTTP.

WSDL is an XML format that allows web service interfaces to be described along with the details of those interfaces' bindings to specific protocols. WSDL is typically used to generate server and client code, and for configuration. A WSDL file describes the protocol bindings and message formats required to interact with the Web services listed in its directory. The supported operations and messages are described abstractly, and then bound to a concrete network protocol and message format.

WSD DEVICES

Some devices that host one or more web services also implement the Devices Profile for Web Services (DPWS) specification. Such devices are referred to hereinafter as WSD devices. The latest draft of the DPWS specification may be found at http://specs.xmlsoap.org/ws/2006/02/devprof/deviceprofile.pdf. The DPWS specification is incorporated by reference as if fully disclosed herein.

DPWS defines a minimal set of implementation constraints to enable secure Web Service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery.

DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery and WS-Eventing. The latest DPWS specification (published in February, 2006) is incorporated herein by reference as if fully disclosed herein.

DEVICE CONTROL PROTOCOL

Some web services conform to certain Device Control Protocol (DCP) specifications. A DCP describes the minimum set of APIs that a web service must implement in order to be compliant with that DCP. For example, a printer DCP specification defines a set of operations (e.g., described in a WSDL file) that a print web service is capable of processing. A scanner DCP specification defines a set of operations that a scan web service is capable of processing. Thus, while a web service typically implements one DCP specification, the web service may implement (or use) multiple Web Services specifications.

DCP specifications may be standardized by W3C or another Web Services standardizing body, such as the Organization for the Advancement of Structured Information Standards (OASIS).

Some of the operations defined by a DCP specification operate on streaming data. An example of a streaming operation is a CreatePrintJob operation (of the printer DCP specification) whose input includes print data, which may be relatively large in size, such as several megabytes. Sometimes, a client (or requesting) application desires that a web service perform additional operations that are not defined in the corresponding DCP specification. In order for the web service to perform those additional operations, the web service must be modified while still conforming to the DCP specification. Updating the code of a web service may require making the device unavailable during a software update or other techniques that are undesirable from the viewpoint of the end user or manufacturer.

SUMMARY

According to an embodiment of the invention, a print device comprises a dispatcher, a configuration file, a plug-in handler, one or more plug-ins, and a print service. The dispatcher is configured to receive SOAP requests from client devices. The configuration file contains one or more mappings, where each of the one or more mappings associates an operation with a plug-in module. The print service is configured to receive print data and generate a printed version of an electronic document reflected in the print data.

The dispatcher is further configured to: (a) receive a SOAP request from a client device, where the SOAP request indicates an operation that the print device is to perform; (b) determine, based on a mapping, in the configuration file, associated with the operation, whether one of the one or more plug-ins is to be utilized; and (c) in response to determining that a particular plug-in of the one or more plug-ins is to be utilized, call the plug-in handler. The plug-in handler is configured to: (a) call the particular plug-in using one or more plug-in APIs, where calling the particular plug-in includes passing print data from the SOAP request to the particular plug-in for processing by the particular plug-in; (b) receive processed print data from the particular plug-in; and (c) send the processed print data to the print service.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Architectural Overview
   2.1 Requesting Application
   2.2 Network
   2.3 Device and Web Services
      2.3.1 SOAP SDK Module
      2.3.2 Web Services Protocol Module
      2.3.3 Abstract API
      2.3.4 Abstract API Implementation
3.0 Plug-in Architecture
   3.1 Dispatcher
   3.2 Plug-in Handler
   3.3 Plug-in Preprocessing
   3.4 Processing Flow
   3.5 Plug-Ins
4.0 Implementation Mechanisms
5.0 Extensions and Alternatives 1.0 General Overview A plug-in architecture for processing operations on WSD DCP devices is described herein. Such a device comprises a dispatcher, a plug-in handler, and one or more plug-ins. The dispatcher receives a SOAP request and determines, based on one or more operations associated with the SOAP request and a configuration file, whether one or more plug-ins need to be invoked. If one or more plug-ins need to be invoked, then the dispatcher calls the plug-in handler and passes data to the plug-in handler, which is configured to call the appropriate plug-in(s) and pass the data to the appropriate plug-in(s). The plug-in handler receives processed data from the appropriated plug-in(s) and sends the data to be processed by a lower level service, such as by a print service, a scan service, a facsimile service, or an archive service.

2.0. Architectural Overview

Figure 1:
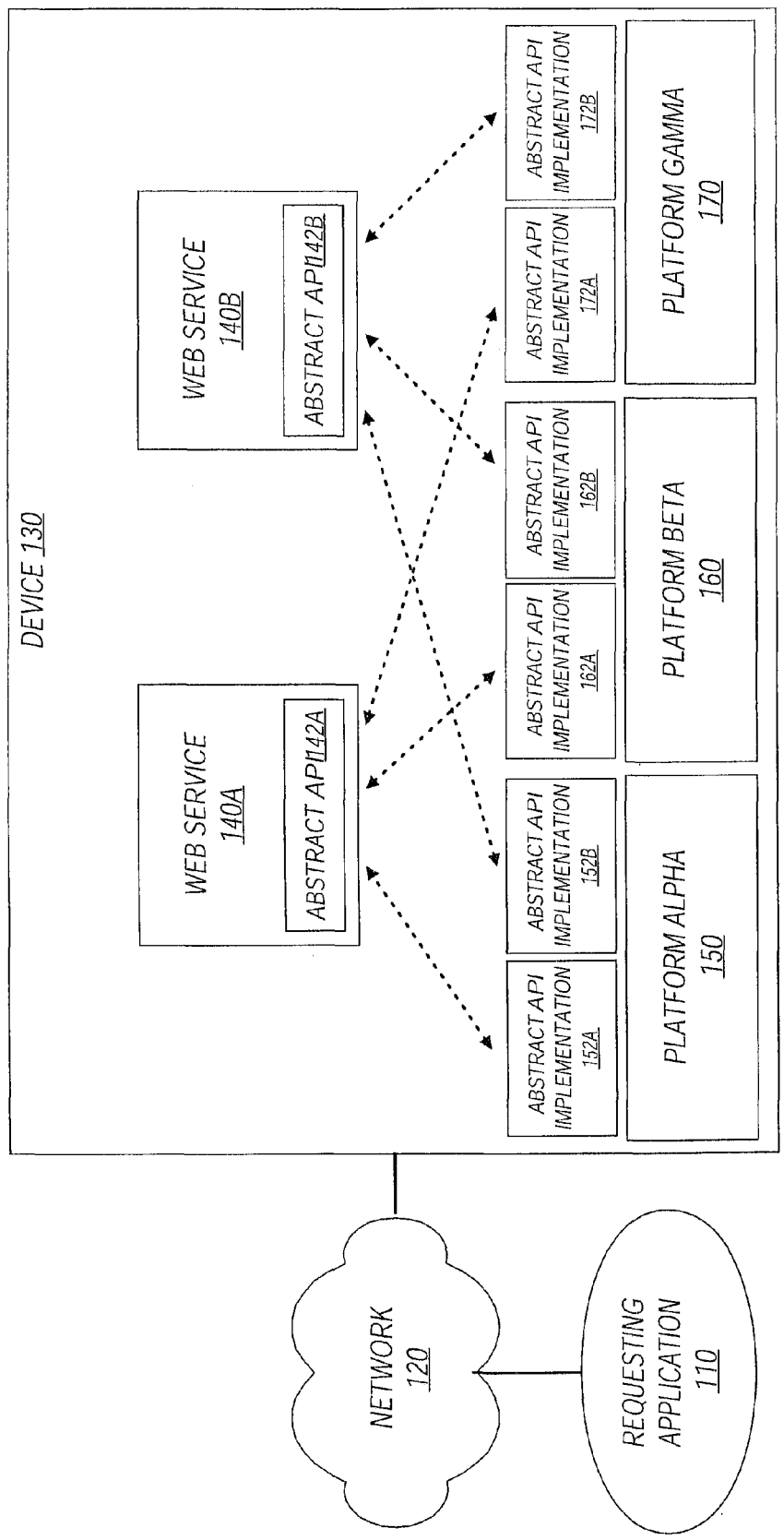
FIG. 1 is a block diagram that depicts an example network architecture for processing SOAP requests on a WSD device, according to an embodiment of the invention.

FIG. 1 is a block diagram that illustrates an architectural overview for processing SOAP requests on a WSD DCP device, according to one embodiment of the invention. FIG. 1 depicts a requesting application 110, a network 120, and a device 130. Non-limiting examples of device 130 include a printing device, a scanning device, a faxing device, an archiving device, or an MFP.

2.1. Requesting Application

Requesting application 110 is an application that is associated with a process that requests one or more of web services 140A-B. Requesting application 110 is typically an application associated with the operating system that supports the initial requesting process. A purpose of requesting application 110 is to convert a platform-specific procedure call, from a requesting process, to a SOAP request that can be processed by a web service, which "understands" SOAP. On the other hand, requesting application 110 may be a GUI that a user interacts with. In that case, requesting application 110 converts user clicks into SOAP requests.

For example, the requesting process may be associated with a Microsoft Word application and web service 140A may be a print service. Requesting application 110 receives a platform-specific "print data" request sent from the requesting process. Requesting application 110 encodes the print data request in a SOAP message that can be processed by web service 140A.

2.2 Network

SOAP communications between requesting application 110 and device 130 may be made over network 120. Network 120 may be implemented by any medium or mechanism that provides for the exchange of data between various nodes in network 120. Examples of such a network include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP) and Internet Protocol (IP).

2.3 Device and Web Services

In the illustrated embodiment, device 130 is a multi-function peripheral (MFP) because device 130 hosts multiple web services: web service 140A and web service 140B. However, device 130 may host more or less web services. Non-limiting examples of web services include a print service, a fax service, a scan service, a copy service, and an archive service. Thus, if web service 140A includes a print service, then the print service is configured to process print data and cause a printed version of an electronic document reflected in the print data to be printed on a tangible medium, such as paper. Each of the services may be implemented in computer software, computer hardware, or any combination of computer software and computer hardware.

Web services 140A-B comprise one or more modules that provide services and that are based on Web Services protocols and technologies. Web services 140A-B are configured to receive and process SOAP requests. By definition, the SOAP request comprises a header section and a body section. The header section comprises one or more portions, each corresponding to and requiring a standard Web Services protocol, such as WS-Security. If web service 140A is not configured to analyze SOAP messages, then web service 140A may invoke a SOAP library routine provided by a SOAP SDK module (not depicted in FIG. 1) in order to understand the structure of the SOAP request. The results of invoking the SOAP library routine on the SOAP request includes (1) an indication that the SOAP request is valid and (2) a set of identifiers that identify one or more Web Services specifications that are specified in the SOAP request.

Based on the results, web service 140A executes one or more functions defined by one or more Web Services specifications to generate additional results. Based on the additional results, web service 140A uses abstract API 142A to generate a platform-specific request that conforms to a communications protocol supported by device 130. Web service 140A then transmits the platform-specific request to the target platform.

In one embodiment, web services 140A-B are associated with a socket where they "listen" for SOAP requests. Web services 140A-B may be configured to listen for SOAP requests at the same socket or at different sockets.

2.3.1 Soap SDK Module

WSDL is used in combination with SOAP and XML Schema to provide web services over the Internet. A client program (e.g. requesting application 202) connecting to a web service (e.g. web service 140A) may read the WSDL file corresponding to the web service and determine what functions the web service supports. Any special datatypes used are embedded in the WSDL file in the form of XML Schema. The client program can then use SOAP to invoke one of the functions listed in the WSDL file.

According to an embodiment, a SOAP SDK module (not depicted in FIG. 1) is a shared library of library routines that implement one or more functions defined by SOAP and/or WSDL. Some of the library routines may correspond to SOAP, while other library routines may correspond to WSDL. The library routines that correspond to SOAP may be associated with the SOAP 1.2 standard or any other version of SOAP. Similarly, the library routines that correspond to WSDL may be associated with the WSDL 1.2 standard or any other version of WSDL. The library routines may correspond to older versions of SOAP and WSDL so that requesting application 110 may operate under the older versions.

A web service may invoke the library routines in the shared library to (1) generate a SOAP message and/or (2) parse a SOAP request that the web service has received. A web service may also invoke library routines in the shared library to package WSDL documents to send to requesting application 110.

In one embodiment, the shared library is implemented as a set of static or dynamic library routines which one or more of web services 140A-B may load into their respective memories. Therefore, web services 140A-B may each invoke different copies of the same library routine. In another embodiment, web services 140A-B invoke a library routine using an API associated with the shared library. The API defines an interface by which a web service invokes one or more functions of the shared library. In this case, the shared library implements the functions specified in a library routine and returns the results to the web service that invoked the library routine.

If a web service invokes a SOAP library routine, then the structure of the SOAP request is analyzed (either locally, in the case of loading the library routine into memory, or by the shared library, in the case of the shared library implementing the function(s) specified in the library routine). If the structure of the SOAP request is valid, then the one or more portions of the SOAP request are identified. Each portion specifies a particular Web Services specification. Results from executing the SOAP library routine may comprise data structures that contain pointers to each portion with an identifier that indicates the Web Services specification or the name of the namespace of the Web Services specification.

Each Web Services specification has an associated namespace. The namespace identifies a particular Web Services specification. Each version of a particular Web Services specification is associated with a different namespace. Therefore, WSDL 1.1 and WSDL 1.2 are associated with different namespaces.

2.3.2 Web Services Protocol Module

In an embodiment, web services 140A-B may share a library of routines (not depicted in FIG. 1) that each implements one or more functions defined by one or more Web Services specifications. This sharing is done instead of each web service 140A-B separately implementing the one or more Web Services specifications. A web service knows which library routine(s) to invoke based on the results of analyzing a SOAP request. This shared library is referred to hereinafter as a Web Services Protocol Module (WSPM).

In one embodiment, the WSPM may be implemented as a set of static or dynamic library routines which web services 140A-B may each load separately into memory. Therefore, each of web services 140A-B may invoke different copies of the same library routine. In another embodiment, web services 140A-B invoke a library routine from the WSPM using an API. The API defines an interface by which a web service invokes one or more functions on the WSPM. In this case, the WSPM implements the functions specified in the library routine and returns the results to the web service that invoked the library routine.

In an embodiment, the WSPM is configured to comprise library routines that correspond to multiple versions of one or more Web Services specifications.

Because multiple web services may invoke the library routines defined in the WSPM, multiple web services may benefit from one WSPM without a web service developer having to know many details about the Web Services specifications implemented by WSPM.

2.3.3 Abstract API

According to an embodiment, web services 140A-B use an abstract API in order to generate platform-specific requests. Web service 140A uses abstract API 142A and web service 140B uses abstract API 142B. The abstract API defines an interface by which the associated web service invokes one or more functions on device 130. Therefore, according to this embodiment, a developer of web service 140A or web service 140B is not required to know the underlying complexities of the target platform, but only of the new service that the developer aims to provide.

2.3.4 Abstract API Implementation

If an abstract API has been defined for a web service, then an implementation of the abstract API for a specific platform must be defined. For example, an abstract API implementation 152A is defined for abstract API 142A on a platform alpha 150. Similarly, an abstract API implementation 172B is defined for abstract API 142B on a platform gamma 170. A corresponding abstract API implementation defines the functions specified in a device-specific request and implemented on the MFP.

Abstract API implementations may be implemented as a library which is compiled into the same application along with the corresponding web service. Abstract API implementations may also be implemented as a separate application.

With this architecture, only the implementer of the abstract API needs to have knowledge of the target platform, whereas the developer of the corresponding web service is not so required.

3.0 Plug-In Architecture

Figure 2:
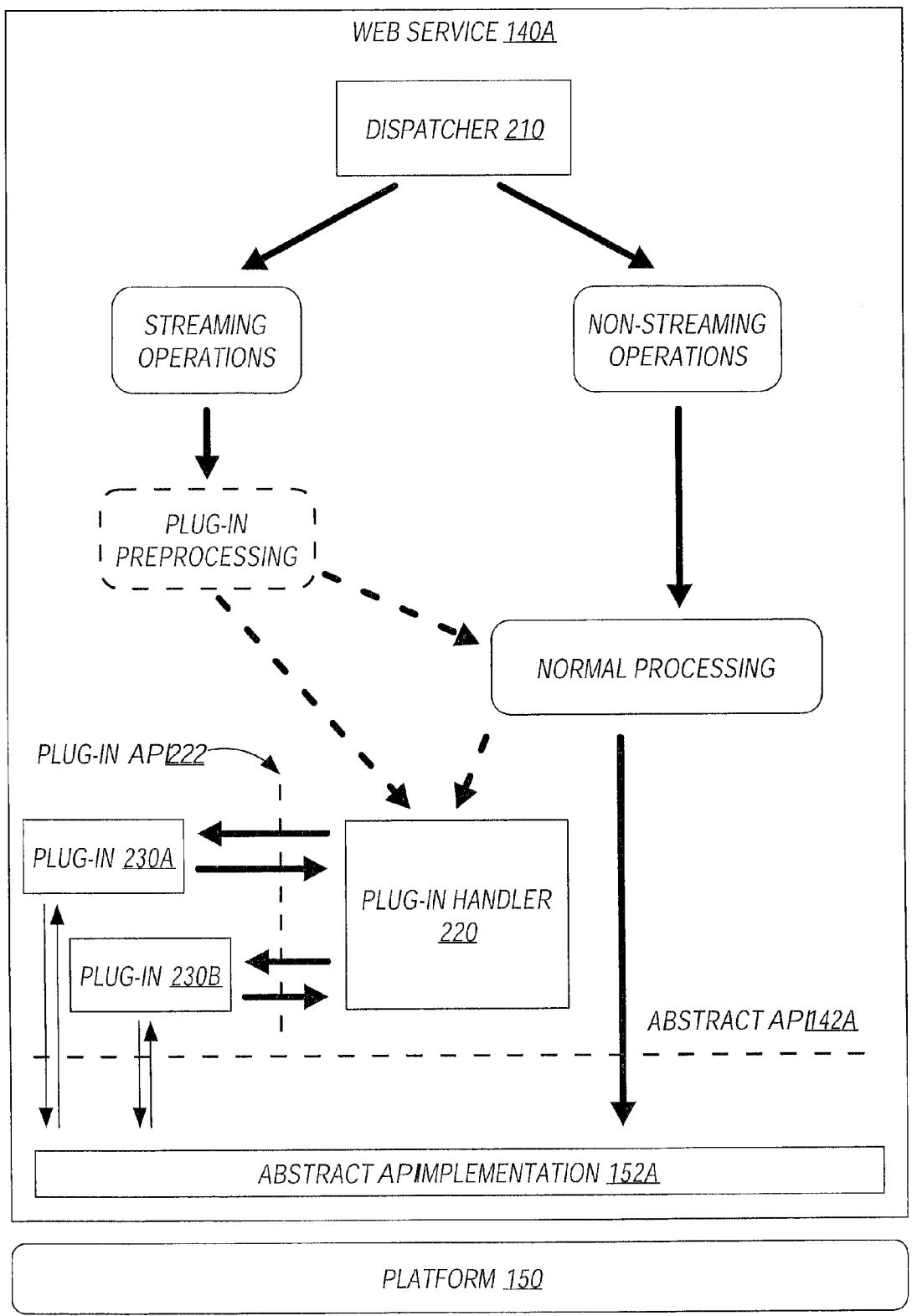
FIG. 2 is a block diagram that depicts a plug-in architecture for WSD DCP operations, according to an embodiment of the invention.

FIG. 2 is a block diagram that depicts a plug-in architecture for WSD DCP operations, according to an embodiment of the invention. Web service 140A (i.e., from FIG. 1) is depicted with a number of components: a dispatcher 210, a plug-in handler 220, and plug-ins 230A-B. In other embodiments of the invention, there may be more or fewer plug-ins. Each of dispatcher 210, plug-in handler 220, and plug-ins 230A-B may be implemented in computer software, computer hardware, or any combination of computer software and computer hardware.

Although the following description is generally provided in the context of printing, other contexts are equally applicable, such as scanning, faxing, copying, and archiving.

3.1 Dispatcher

Dispatcher 210 is configured to receive SOAP requests from client devices. Based on a particular SOAP request, dispatcher 210 determines what type of operation is requested. Depending on the type of operation, dispatcher 210 causes the SOAP request to be processed in one of two ways: according to "normal" processing or using one or more of plug-ins 230A-B. Normal processing refers to processing that does not require the processing of any plug-ins related components, such as plug-in handler 220 and plug-ins 230A-B.

According to FIG. 2, dispatcher 210 distinguishes between streaming operations and non-streaming operations. A streaming operation is an operation where multiple network packets are required to carry out the operation. Although there may be multiple network packets, the multiple network packets are associated with a single SOAP request. An example of a streaming operation is a SendJobDocument operation specified in a SOAP request where the print data of the print job is included in multiple network packets. However, in other embodiments, one or more non-streaming operations require one or more of plug-ins 230A-B.

A streaming operation does not require all the pertinent data to be buffered before one or more of plug-ins 230A-B begin processing the data. For example, some of the print data associated with a SendJobDocument operation may not have been received at device 130 before plug-in 230A begins processing the received print data.

However, even if the specified operation is the type of operation that may be handled by one or more plug-ins, there may be one or more additional criteria that ultimately determines whether one or more plug-ins will process the data associated with the operation. For example, plug-in 230A may be a plug-in that decrypts encrypted print data. In that case, even if the operation is a streaming operation (e.g., a SendJobDocument operation associated with a large payload, such as several megabytes), if the payload is not encrypted, then plug-in 230A is not invoked.

As another example, device 130 may only be capable of printing in black and white. If a SOAP request (that specifies a CreatePrintJob operation) indicates that the print data is in color, then dispatcher 210 calls plug-in handler 220 and causes a particular plug-in (e.g., plug-in 230A) to convert the print data to black and white. Otherwise, dispatcher 210 causes the print data to be processed normally.

In an embodiment, dispatcher 210 determines whether one or more of plug-ins 230A-B are to process data in a SOAP request based on a configuration file. A configuration file includes one or more mappings where each mapping associates an operation and zero or more criteria with one or more plug-ins. An example format is <operation, criterion$_1$, . . . , criterion$_n$, plug-in>. For example, one mapping may be "<CreatePrintJob, compressed, plug-in1>," another mapping may be "<CreatePrintJob, encrypted, plug-in2>," and another mapping may be "<CreatePrintJob, color, plug-in3>." Whenever a new plug-in is added to or removed from device 130, the functionality of dispatcher 210 and the plug-in handler 220 need not be modified. Instead only the configuration file needs to be updated.

3.2 Plug-In Handler

If dispatcher 210 determines that one or more plug-ins should be invoked, then dispatcher 210 calls plug-in handler 220. Plug-in handler 220 is configured to receive data from dispatcher 210 (or access the data in a shared memory location) and interact with one or more of plug-ins 230A-B via plug-in API 222. A non-limiting example of plug-in API 222 may include "SendFirstChunk" (indicating the first set of data associated with the present operation), "SendNextChunk" (indicating an intermediate set of data in that operation), and "SendLastChunk" (indicating the last set of data in that operation). Plug-in handler 220 may "receive" data from dispatcher 210 by receiving, from dispatcher 210, location information that indicates where the data may be accessed, such as a location in shared memory.

3.3 Plug-In Pre-Processing

In an embodiment, before dispatcher calls plug-in handler 220, and as depicted in FIG. 2, one or more plug-in pre-processing steps are performed before plug-in handler 220 sends the pertinent data (or location information) to one or more of plug-ins 230A-B via plug-in API 222. Non-limiting examples of plug-in pre-processing include initializing a plug-in, allocating memory for the plug-in, loading the plug-in into memory, preparing a buffer for the data that the plug-in will process, and retrieving external information (e.g., a dictionary for translation). As these examples indicate, some pre-processing steps may only be performed once after device start-up or once per streaming operation instead of being performed for each network packet associated with a single operation (e.g., a SendJobDocument operation).

3.4 Processing Flow

According to FIG. 2 and as indicated above, one or more plug-in pre-processing steps may be performed before plug-in handler 220 sends data (or location information) to one or more of plug-ins 230A-B. FIG. 2 also depicts that processing flow may involve one or more "normal" processing steps after the one or more plug-in pre-processing steps are performed. Alternatively, depending on the operation associated with the SOAP request, such normal processing steps may not be required. Alternatively still, processing may proceed from dispatcher 210 directly to plug-in handler 220 without any intermediate plug-in pre-processing steps or normal processing steps. An example of "normal" processing includes the parsing of SOAP messages.

3.5 Plug-Ins

Each of plug-ins 230A-B is configured to perform one or more operations. Non-limiting examples of operations that a plug-in may perform on data (e.g., print data, scan data, fax data, etc.) include decryption, decompression, conversion, i.e., from one format to another (e.g., from one page description language (PDL) to another PDL that the hardware understands), and translation.

In an embodiment, device 130 may include multiple plug-ins that perform a particular operation but for different type of data. For example, plug-in 230A may decompress data that was compressed according to a first compression technique while plug-in 230B may decompress data that was compressed according to a second compression technique.

In an embodiment, multiple plug-ins are "chained" together. For example, plug-in 230B processes a particular chunk of data after plug-in 230A has processed that particular chunk. Subsequently, another plug-in (not depicted in FIG. 2) may process the particular chunk after plug-in 230B is finished processing the particular chunk. Specifically, plug-in 230A may decompress the payload of a SOAP request, after which plug-in 230B may decrypt the decompressed data, after which the other plug-in may convert the format of the decrypted data from one PDL to another. Dispatcher 210 may determine, e.g., based on multiple mappings in a configuration file, that multiple plug-ins are required to process data from one or more related SOAP request. Accordingly, dispatcher 210 instructs plug-in handler 220 to call the multiple plug-ins in a particular order.

In an embodiment, one or more of plug-ins 230A-B are configured to buffer multiple chunks of data (i.e., data from multiple plug-in API calls) before the plug-in(s) begins processing. For example, plug-in 230A may perform a decryption operation on encrypted data. However, plug-in 230A may require a particular amount of data before the decryption operation can begin. If the first chunk of data is not at least as large as the particular amount, then plug-in 230A buffers the first chunk and does not produce any output until plug-in handler 220 sends the second chunk of data. Plug-in 230A then determines whether the first and second chunks of data together are at least as large as the particular amount. If so, then plug-in 230A begins performing the decryption operation. If not, then the second chunk is also buffered and the process repeats.

As depicted in FIG. 2, one or more of plug-ins 230A-B may invoke one or more routines, via abstract API 142A, that are implemented by abstract API implementation 152A. This may be performed for multiple reasons. One possible reason is for a plug-in to access information from the abstract API implementation (e.g., a print engine if the device is a print device). For example, the print engine may be updated with additional features, such as a new encoding scheme. Instead of re-configuring the plug-in to perform the new encoding scheme, the plug-in may be a generic or "universal" encoder plug-in that could be used for any type of encoding scheme. In that case, the plug-in is configured to retrieve a particular mapping or rules table from the print engine and use that table to encode print data that is sent from plug-in handler 220.

4.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
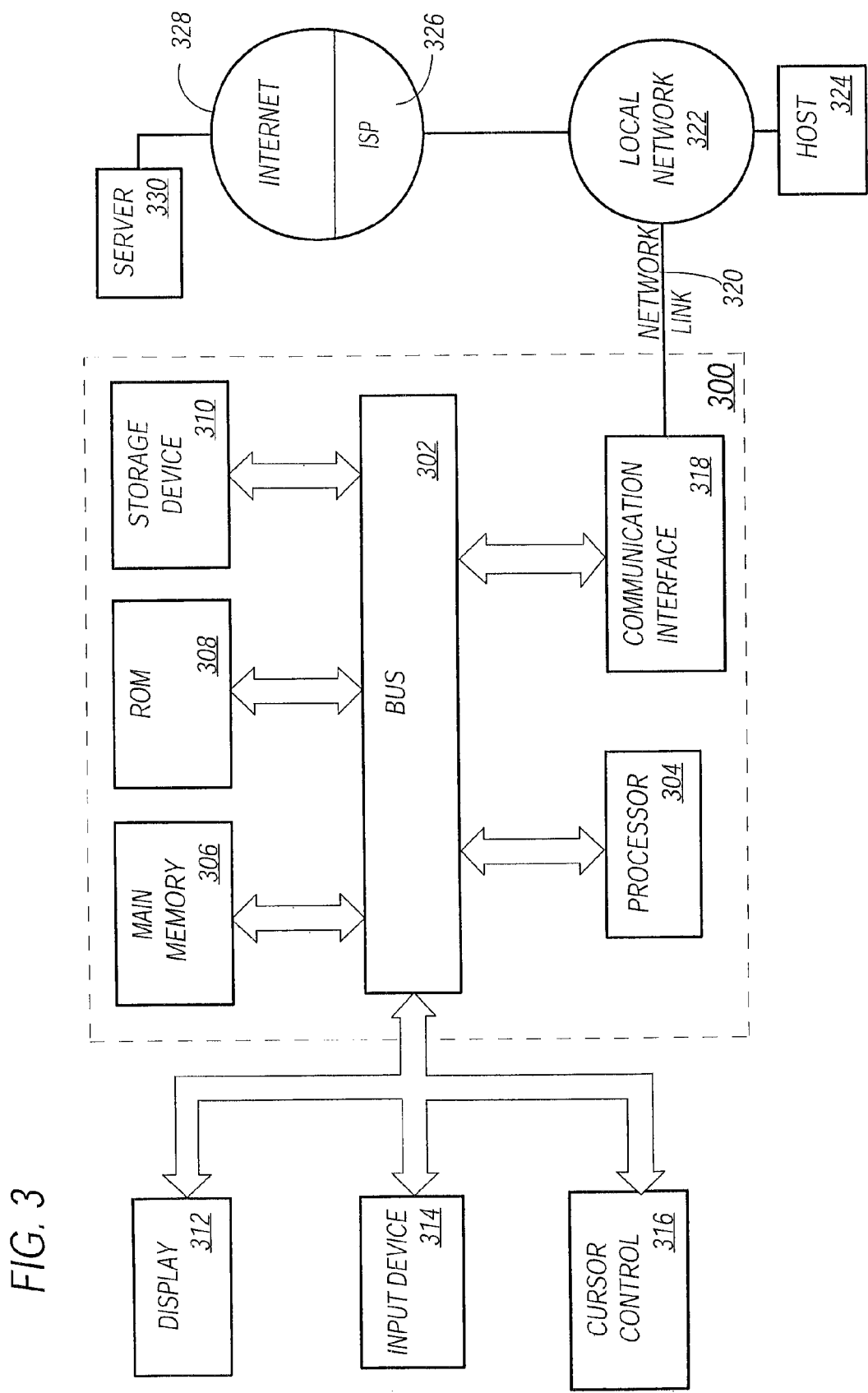
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A print device comprising:
   one or more hardware processors;
   a dispatcher that is configured to receive SOAP requests from client devices;
   configuration data that indicates one or more mappings, wherein each of the one or more mappings associates an operation with a plug-in module;
   a plug-in handler;
   one or more plug-ins;
   a print service that conforms to a standard specification and that is configured to receive print data and generate a printed version of an electronic document reflected in the print data;
   wherein the dispatcher is further configured to:
      receive a SOAP request from a client device, wherein the SOAP request indicates a particular operation that is not defined in the standard specification and that the print device is to perform;
      determine, based on a mapping, reflected in the configuration data, associated with the particular operation, whether one of the one or more plug-ins is to be utilized; and
      in response to determining that a particular plug-in of the one or more plug-ins is to be utilized, call the plug-in handler;
   wherein the plug-in handler is configured to call the particular plug-in using one or more plug-in APIs, wherein calling the particular plug-in includes passing particular print data from the SOAP request to the particular plug-in for processing by the particular plug-in to generate processed print data;
   wherein the plug-in handler is configured to receive the processed print data from the particular plug-in; and
   wherein the plug-in handler is configured to send the processed print data to the print service.

2. The print device of claim 1, wherein:
   the mapping indicated in the configuration data associates the particular operation with the particular plug-in and with one or more criteria that must be satisfied in order for the particular plug-in to be called; and
   determining that the particular plug-in is to be utilized comprises determining that the one or more criteria associated with the mapping are satisfied.

3. The print device of claim 1, wherein the particular operation is one of a format conversion operation or a translation operation.

4. The print device of claim 1, wherein:
   the particular plug-in is configured to request data from the print service;
   the particular plug-in is configured to receive the data from the print service; and
   the particular plug-in is configured to process the particular print data, received from the plug-in handler, based on the data.

5. The print device of claim 1, wherein the plug-in handler sends the processed print data to the print service via one or more APIs.

6. The print device of claim 1, determining that the particular plug-in is to be utilized comprises determining, based on the particular operation being a streaming operation, that the particular plug-in is to be utilized.

7. The print device of claim 1, wherein:
the one or more plug-ins comprise multiple plug-ins;
the dispatcher is configured to determine, based on the configuration data and the SOAP request, that a plurality of multiple plug-ins are to be utilized; and
the plug-in handler is configured to call each of the plurality of multiple plug-ins in a particular order.

8. The print device of claim 1, wherein the particular operation is one of a decryption operation or a decompression operation.

9. The print device of claim 1, wherein the particular plug-in is configured to buffer multiple chunks of data before the particular plug-in begins processing.

10. The print device of claim 1, wherein the one or more plug-in APIs include:
a first API call that indicates a first set of data associated with the particular operation;
a second API call that indicates an intermediate set of data associated with the particular operation; and
a third API call that indicates a last set of data associated with the particular operation.

11. One or more non-transitory storage media storing instructions which, when processed by one or more processors, cause:
a dispatcher, of a print device, receiving a SOAP request from a client device, wherein the SOAP request indicates a particular operation that the print device is to perform;
wherein the print device comprises the dispatcher, a configuration file, a plug-in handler, one or more plug-ins, and a print service;
wherein the configuration file contains one or more mappings, wherein each of the one or more mappings associates an operation with a plug-in module;
wherein the print service conforms to a standard specification and is configured to receive print data and generate a printed version of an electronic document reflected in the print data;
wherein the particular operation indicated in the SOAP request is not defined in the standard specification;
the dispatcher determining, based on a mapping, in the configuration file, associated with the particular operation, whether one of the one or more plug-ins is to be utilized;
in response to determining that a particular plug-in of the one or more plug-ins is to be utilized, the dispatcher calling the plug-in handler;
in response to the dispatcher calling the plug-in handler, the plug-in handler calling the particular plug-in using one or more plug-in APIs, wherein calling the particular plug-in includes passing particular print data from the SOAP request to the particular plug-in for processing by the particular plug-in to generate processed print data;
the plug-in handler receiving the processed print data from the particular plug-in; and
the plug-in handler sending the processed print data to the print service.

12. The one or more non-transitory storage media of claim 11, wherein:
the mapping indicated in the configuration file associates the particular operation with the particular plug-in and with one or more criteria that must be satisfied in order for the particular plug-in to be called; and
determining that the particular plug-in is to be utilized comprises determining that the one or more criteria associated with the mapping are satisfied.

13. The one or more non-transitory storage media of claim 11, wherein the particular operation is one of a format conversion operation, or a translation operation.

14. The one or more non-transitory storage media of claim 11, wherein the instructions include further instructions which, when processed by the one or more processors, further cause:
the particular plug-in requesting data from the print service;
the particular plug-in receiving the data from the print service; and
the particular plug-in processing the particular print data, received from the plug-in handler, based on the data.

15. The one or more non-transitory storage media of claim 11, wherein the instructions include further instructions which, when processed by the one or more processors, further cause the plug-in handler sending the processed print data to the print service via one or more APIs.

16. The one or more non-transitory storage media of claim 11, wherein determining that the particular plug-in is to be utilized comprises determining, based on the particular operation being a streaming operation, that the particular plug-in is to be utilized.

17. The one or more non-transitory storage media of claim 11, wherein:
the one or more plug-ins comprise multiple plug-ins;
the dispatcher determining that the particular plug-in is to be utilized comprises determining that a plurality of the multiple plug-ins are to be utilized; and
the plug-in handler calling each of the plurality of the multiple plug-ins in a particular order.

18. The one or more non-transitory storage media of claim 11, wherein the particular operation is one of a decryption operation or a decompression operation.

19. The one or more non-transitory storage media of claim 11, wherein the particular plug-in is configured to buffer multiple chunks of data before the particular plug-in begins processing.

20. The one or more non-transitory storage media of claim 11, wherein the one or more plug-in APIs include:
a first API call that indicates a first set of data associated with the particular operation;
a second API call that indicates an intermediate set of data associated with the particular operation; and
a third API call that indicates a last set of data associated with the particular operation.

* * * * *